United States Patent [19]

van der Kolk et al.

[11] 4,059,998

[45] Nov. 29, 1977

[54] GAS PRESSURE THERMOMETER, AND APPARATUS FOR APPLICATION IN A GAS PRESSURE THERMOMETER

[75] Inventors: Albertus van der Kolk; Johannes-Gerhardus Stiller, both of Roden, Netherlands

[73] Assignee: Stiko B.V., Roden, Netherlands

[21] Appl. No.: 680,552

[22] Filed: Apr. 27, 1976

[30] Foreign Application Priority Data

Apr. 28, 1975 Netherlands .......................... 7505015

[51] Int. Cl.$^2$ ........................... G01K 5/28; G01K 5/36
[52] U.S. Cl. .................... 73/368.2; 73/368.6; 73/411
[58] Field of Search ................. 73/368.2, 368.4, 368.6, 73/411; 236/57

[56] References Cited

U.S. PATENT DOCUMENTS

| 3,410,141 | 11/1968 | Zurstadt | 73/368.6 X |
| 3,766,783 | 10/1973 | Tortoso | 73/368.4 X |
| 3,975,967 | 8/1976 | Conti | 73/411 |

*Primary Examiner*—Richard C. Queisser
*Assistant Examiner*—Charles Garenstein
*Attorney, Agent, or Firm*—Burgess, Dinklage & Sprung

[57] ABSTRACT

A thermometer comprising an indicator, recording or control section and a measuring section coupled therewith comprising a closed system comprising a gas container, a Bourdon tube and a capillary, said measuring portion comprising a gas under increased pressure, whereby the increased initial pressure has a value above which, upon isothermical pressure increase, the gas is subjected to a reduction in compressibility. The Bourdon tube is made of a hardened chromium-molybdenum alloyed steel.

4 Claims, No Drawings

GAS PRESSURE THERMOMETER, AND APPARATUS FOR APPLICATION IN A GAS PRESSURE THERMOMETER

The present invention relates to a gas pressure thermomometer comprising an indicator, recording or a control section and a measuring section coupled therewith, comprising a closed or shut off system, comprising a gas having an increased initial pressure, said measuring section comprising a gas container, a Bourdon tube and a capillary which connects the gas container to the Bourdon tube.

Gas pressure thermometers of the above described type are generally known and are described and shown e.g. in De Ingenieur 46 (1954) pages 0 84–0 86. An essential part of the gas pressure thermometer is constituted by the measuring section, which as mentioned above, comprises a gas container, a Bourdon tube and a capillary connecting the gas container to the Bourdon tube. The gas container is at the same time a heat exchange member and functions as such as temperature recording element or sensor. The Bourdon gauge or -spring, as is known, is a member made of a metal tube having a flat cross section, e.g. an elliptical or rectangular cross section and which is bent to ¾ of a circle or may be spirally or helically wound. When the gas pressure in the Bourdon spring is increased, this will have the tendency to stretch and to assume a circular cross section to arrive at an increase in volume, respectively upon a pressure reduction, to perform the opposite movement. The movement of the spring will lead to a displacement of the free end of the tube not connected to the capillary. Said displacement may be utilized for instance by coupling the Bourdon spring to an indicator member, such as a pointer, in combination with a graduation, for determining the size of the phenomenon producing the gas pressure change, in other words in the present case for measuring temperature changes.

The capillary connecting the gas container to the Bourdon tube may have a considerable length, e.g. 10–20 m, so that the thermometer can be designed as a remote thermometer.

In the manufacture of gas pressure thermometers, at least of the measuring portion thereof containing a gas at increased pressure, the assumption is that the operation, in case of an optimal approach, should be based on the gas law for an ideal gas, applied to a specific weight and constant volume, so according to the equation $P1/T_1 = P2/T_2$, thus obtaining a linear relation between the temperature change and the pressure change. As mentioned above, the Bourdon spring, upon a gas pressure change, is subjected however to a volume change so that no compliance is made with the starting condition for a gas system having constant volume and so that the measuring accuracy is adversely affected. Moreover, changes in the ambient temperature will also lead to changes in the volume of the Bourdon spring and of the capillary and as a result will likewise adversely affect the measuring accuracy. This adverse effect of the measuring accuracy can be eliminated by making the volume of the gas container large relative to that of the capillary and of the Bourdon spring. According to the above cited article in De Ingenieur, there is maintained in the known gas pressure thermometers for obtaining a measuring accuracy of about 1%, a gas container having a volume of 50–100 cm³. Starting from this, the combination of the volume of the gas container and the quantity, so pressure of the gas in the measuring section can be so chosen that the measuring range of the thermometer over 270° of arc is not less than 100° C.

The required comparatively large capacity of the known gas container for maintaining a desired measuring accuracy on the one hand, is a drawback for the handling and for the application possibilities of the thermometer on the other hand. Moreover, a larger gas container produces a slower indication as a result of the increased heat capacity thereof.

A survey is given of industrial thermometers by H. Brolsma in the book "Temperatuurmetingen, basiskennis Meet- en Regeltechniek", ("Temperature measurements, basic knowledge of Measuring- and Regulating engineering"), published by Technische Uitgeverij H. Stam N.V., in conjunction with the Foundation "Bemetel", second edition, February 1969, pages 20 ff., the operation of said thermometers is based on the property of substances to expand upon a temperature increase and vice versa. This category comprises the gas pressure thermometers and furthermore spirit thermometers which contain as filler an organic liquid, such as pentane, or mercury (so called "mercury-in-steel" thermometers). It is mentioned with respect to the pressure of the filler medium that on account of a smaller compressibility of mercury, a filling pressure to about 175 kg/cm² is allowable with the mercury-in-steel thermometers. Upon application of an organic liquid as filler, however, a smaller filling pressure should be employed than in the case of mercury, viz. 5–50 kg/cm² because these liquids have a larger compressibility than with mercury. In accordance with this principle, so the application in case of a larger compressibility of the filler medium of a smaller filling pressure or initial pressure, a filling pressure of not more than 50 kg/cm² is maintained when a gas is used as filler medium, so in gas pressure thermometers.

Also according to this publication the measuring accuracy is enhanced by choosing the ratio of the volume of the gas container relative to that of the Bourdon gauge and the capillary large, e.g. 50 : 1; the gas container may for instance have a diameter of 20 mm and a length of 125 mm. It is furthermore observed that in general the capacity of a filler container in gas pressure thermometers is larger than in case of spirit thermometers.

In U.S. Pat. No. 3,410,141 there is given a survey of the properties of a conventional gas pressure thermometer, in which respect it is stressed that the gas container volume relative to the volume of the Bourdon gauge should be large in order to produce, upon temperature measurements, a sufficient pressure change in the Bourdon gauge so as to cause a sufficient displacement of the gauge. The idea underlying this feature is naturally likewise based on the gas law, indicating as a matter of fact that the effect of a change in condition which the gas undergoes is also dependent on the quantity of the gas. For obtaining, in gas pressure thermometers, a sufficiently strong effect upon a temperature change, according to the U.S. patent an increase of the gas quantity in conventional gas pressure thermometers is sought therefore in an increase in the gas container volume. Now according to the U.S. patent a gas pressure thermometer is made available of which the gas container contains a solid material which, at low temperatures, adsorbs the gas and, at higher temperatures, desorbs the gas, which results in a more abrupt pressure-temperature relation and thereby smaller gas containers can be employed, e.g. a gas container having a volume of about 3 cm³ as against a gas container volume of about 65 cm³ in conventional gas pressure thermometers.

The gas pressure in the thermometer according to the U.S. patent at about 15° C, dependent on the type of gas and adsorption material, appears to be about 1.8–5.6 kg/cm² of gauge pressure.

Accordingly to the invention there is now provided a gas pressure thermometer whereby, in contrast to the prevailing conception that according as the filler medium in a thermometer generally based on the expansion of a medium, has an increasing compressibility, lower initial pressures are employed, the initial pressure has a value above which, upon isothermal pressure increase, the gas precisely is subjected to a compressibility reduction.

In the gas pressure thermometer according to the invention an initial pressure of e.g. 140 kg/cm² or even 175 kg/cm² can be conveniently employed, such as in mercury-in-steel thermometers, and higher without affecting the proper operation of the thermometer, e.g. of the measuring accuracy of about 1% of the measuring range seems conventional for gas pressure thermometers. The final pressure permissible for a temperature measurement in the measuring element of the gas thermometer according to the invention depends on the phenomenon that at high temperatures the filling gas can diffuse through the metal of which the measuring element is made, and furthermore of the practical consideration that a certain overloading of the thermometer should be possible without damaging the meter.

Preferred are those as pressure thermometers according to the invention wherein the measuring section contains nitrogen at an increased initial pressure of at least 175 kg/cm² and having a measuring range corresponding with a final pressure of 400 kg/cm².

Because of the very high gas pressure in the gas pressure thermometer according to the invention, even a much smaller capacity of the gas container will suffice, not only without appreciable disadvantage for the operation of the Bourdon spring, but rather with such improved operation that a considerably smaller measuring range can be obtained over the indicator scale of the gas pressure thermometer than the minimum measuring range of 100° C, which has to be maintained, as already mentioned, in the known gas pressure thermometers.

Thermometers having a small minimum measuring range are mostly of importance for application under the circumstances prevailing in the preparation and storage of consumption articles, such as foodstuffs and luxuries, beverages etc. Already a comparatively slight increase in temperature may cause for this kind of articles deterioration of the article or a reduction of the quality of the taste. Hitherto the mercury-in-steel thermometers have been applied in practice for controlling the temperature in those cases wherein this type of products is concerned, because only these mercury-in-steel thermometers can be manufactured with a sufficiently small minimum measuring range to enable with sufficient accuracy a temperature control within a narrow temperature range. However, needless to say that the application of mercury containing thermometers is to be considered as highly undesirable precisely for articles of consumption with a view to the latent danger of mercury pollution.

In a preferred embodiment of the gas pressure thermometer according to the invention, in connection with its application in particles of consumption, as described in the above, the initial pressure of the gas has a value at which the measuring range of the thermometer is 40° C over a scale of 270° of arc. Such a gas pressure thermometer is very suitable for replacing mercury-in-steel thermometers, in particular in the application thereof in the above mentioned articles of consumption, which was not possible hitherto.

It is surprising that, in spite of application of very high initial pressures of at least 175 kg/cm² or higher in the measuring section, at which pressures it may be anticipated that the gas can decidedly no longer be considered an ideal gas, consequently in accordance therewith large deviations with respect to the gas law on which the operation of the gas pressure thermometers is based, are to be anticipated, yet gas pressure thermometers are provided to the invention which have an entirely reliable and reproducible operation with a measuring accuracy of less than 1% of the measuring range, as will be demonstrated yet.

The application of a high gas pressure also results in a considerable adjusting force of the Bourdon spring, so that the gas pressure thermometer according to the invention, in addition to being an indicating thermometer, may also be designed as a remote thermometer, likewise suitable to be designed as a recording thermometer or as a controlling thermometer.

The construction of the gas pressure thermometer and of the associated measuring element according to the invention corresponds with that of the known apparatus, as for instance described in the above mentioned publication in De Ingenieur 46 (1954) 0 84–0 86, to which reference is made for brevity's sake. This also applies for the gases to be used as gas filling, for which purpose preferably use is made of nitrogen, on account of the accessibility thereof, the manner of filling, adjusting and calibrating of the gas pressure thermometers, and, if desired, with a view to the measuring accuracy, the realization of a further compensation of the Bourdon spring for the volume change by heating or cooling during a measurement or by exchanges of the ambient temperature, by means of a bimetal.

Furthermore the invention relates to an apparatus comprising a container for gas, a Bourdon tube and a capillary which connects the gas container to the Bourdon tube, said Bourdon tube being made of a hardened chromium-molybdenum alloyed steel containing 0.25–0.30% C, 0.15–0.35% Si, 0.50–0.70% Mn, less than 0.030% P, less than 0.020% S, 0.9–1.2% Cr and 0.15–0.25% Mo The hardening of this material may take place by cooling in oil as from about 850° C or as from about 830° C in water, the material being maintained at least for about 15 minutes at the hardening temperature, whereafter it is tempered by heating same at least for ½ hours at temperatures to about 400° C. Preferably hardening takes place by heating for 20 minutes at 880° C in a neutral atmosphere, cooling in oil and tempering for 60 minutes at 350° C in a neutral atmosphere. In a Bourdon spring made of said material a spring stroke can be attained of about 50 mm, as occurs in a gas pressure thermometer having a measuring range of 40 kg/cm² over a scale of 270° of arc and an initial pressure of about 330 kg/cm², while furthermore such a Bourdon spring is completely satisfactory yet at a gas pressure to about 600 kg/cm². It was found that through application of a high gas pressure and the above described material for manufacturing the Bourdon spring, properly functioning gas pressure thermometers can be obtained having a gas tank volume of no more than about 1 cm³. In such small gas tanks the application possibilities of gas pressure thermometers in general are considerably broadened, while such small containers considerably promote a rapid response of the meter as a matter of fact.

In a further explanation of the invention temperature measurements are carried out by means of the below-mentioned gas pressure thermometer according to the invention. The technical data of the gas pressure thermometer were: embodiment as a dial thermometer with remote sensor:

| | |
|---|---|
| measuring range | : 0 ... 120° C |
| minimally allowable temperature | : 0° C |
| maximally allowable temperature | : 120° C |
| diameter of casing | : 112 mm |
| diameter of scale | : 74 mm |
| graduation | : 1K/s.d. |
| dimensions of sensor | : φ 12 × 145 mm |
| material of sensor[1] | : stainless steel |
| dimensions of capillary | : φ 2,5 × 1890 mm |
| material of capillary[1] | : stainless steel |
| gas filling | : nitrogen |
| initial pressure of the gas filling | : 12 MPa |
| accuracy indication | : ± 1% of the entire scale |

[1] stainless steel of the above described type, hardened by heating for 20 minutes at 880° C in a neutral atmosphere, cooling in oil and tempering for 60 min. at 350° C in a neutral atmosphere.

By means of this meter temperature measurements were carried out on a water bath, of which the temperature was gradually increased to 100° C and subsequently was reduced again. The measuring values were detected as shown in the below mentioned table.

TABLE

| ambient temp. ° C | before overloading 20 | | after overloading 20 | | 32 | |
|---|---|---|---|---|---|---|
| | correction[1] | | correction[1] | | correction[1] | |
| actual temperature | before tapping | after tapping | before tapping | after tapping | before tapping | after tapping |
| heating °C | K | K | K | K | K | K |
| 20 | +0,45 | | 0,0 | 0,0 | +0,55 | +0,15 |
| 30 | +0,35 | | −0,65 | −0,65 | | |
| 40 | +0,40 | +0,15 | +0,6 | −0,3 | +0,8 | +0,6 |
| 60 | | | +0,2 | +0,1 | +0,5 | +0,3 |
| 80 | | | +1,1 | +1,0 | +0,3 | +0,1 |
| 100 | | | +0,3 | +0,2 | 0,0 | −0.1 |
| cooling 80 | | | −0,1 | 0,0 | −0,1 | −0,1 |
| 60 | | | −0,3 | 0,0 | −0,1 | +0,2 |
| 40 | | | +0,1 | +0,3 | +0,2 | +0,3 |
| 30 | | | −0,3 | −0,1 | | |
| 20 | −0,35 | +0,15 | −0,3 | −0,2 | +0,1 | +0,4 |
| 0 | | | −0,2 | −0,1 | −0,4 | 0,0 |

[1] actual temperature = indicated value + correction

These measurements show that the accuracy of the instrument remains within ± 1%.

We claim:

1. A gas pressure thermometer, comprising an indicator, recording or control section, and a measuring section coupled therewith and comprising a closed system containing a gas having an increased initial pressure, which measuring section comprises a container for gas, a Bourdon tube and a capillary which connects the gas container to the Bourdon tube, characterized in that increased initial pressure has a value above which, upon isothermal pressure increase, the gas undergoes a compressibility reduction.

2. A gas pressure thermometer according to claim 1, wherein the measuring section contains nitrogen having an increased initial pressure, characterized in that the initial pressure is at least 175 kg/cm² and that the measuring range corresponds with a final pressure of 400 kg/cm².

3. A gas pressure thermometer according to claim 1, characterized in that the initial pressure of the gas has a value at which the measuring range of the thermometer is 40° C over a scale of 270° of arc.

4. An apparatus comprising a gas container, a Bourdon tube and a capillary which connects the gas container to the Bourdon tube, for application as the measuring section in the gas pressure thermometer according to claim 1, characterized in that the Bourdon tube is made of a hardened chromium-molybdenum alloyed steel, containing 0.25–0.30% C, 0.15–0.35% Si, 0.50–0.70% Mn, less than 0.030% P, less than 0.020% S, 0.9–1.2% Cr and 0.15–0.25% Mo.

* * * * *